divided into 1
3,314,968
SALTS OF NAPHTHENOYL SARCOSINE

Reginald L. Wakeman, Philadelphia, Pa., and Zdzislaw W. Dudzinski, Hasbrouck Heights, N.J., assignors, by mesne assignments, to Millmaster Onyx Corporation, New York, N.Y., a corporation of New York
No Drawing. Filed May 23, 1963, Ser. No. 282,578
2 Claims. (Cl. 260—309.6)

This invention relates to an acyl substitute sarcosine in which the acyl radical is derived from naphthenic acids. It also relates to various salts and derivatives thereof.

Naphthenic acids are well known to the art and are available commercially, primarily as the result of various extractive procedures carried out in refining naturally occurring petroleums and petroleum fractions, particularly gas-oil distillates boiling in the range 400–700° F. Naphthenic acids are found particularly in petroleum originating in the western part of the United States, especially California, in the northern part of South America, especially Venezuela and Colombia, in the southern part of Europe, especially Rumania, and to a lesser extent in crude oils originating in Louisiana, along the Texas gulf coast, in Peru, Mexico, Poland, the Soviet Union and Germany.

The chemical nature of these naphthenic acids is more or less ill-defined, but they all have in common the characteristic of possessing alicyclic nuclei. These may be five or six membered carbon atom ring systems, various condensed ring systems, and other related materials as disclosed in Fieser, "Organic Chemistry," 3rd ed. 1956, pages 97–98.

It has long been known that naphthenic acids and various derivatives thereof, especially salts of barium, lead and certain amines, are useful in the preparation of paint driers, rubber chemicals, and various detergents, and in the formulation of cutting and grinding fluids, corrosion inhibitors, lubricants, and the like.

We have now found that enhanced performance of naphthenic acids in such applications can be obtained by converting the naphthenic acids into corresponding napthenoyl sarcosines having the structure:

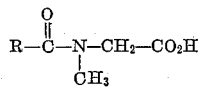

in which the

is the mixed naphthenoyl radical corresponding to naphthenic acids minus the hydroxyl group of the carboxylic acid. The term naphthenoyl is used herein to define this radical and is intended to embrace single carboxylic acids and, especially, mixtures thereof as derived from various petroleum bases.

Naphthenoyl sarcosines can be obtained by first converting the naphthenic acids themselves to the corresponding acid chlorides and then reacting the naphthenoyl chlorides thus formed with sodium sarcosinate. The naphthenoyl chlorides may be produced by any conventional method used for converting a carboxylic acid to the corresponding acid chloride. We have found it particularly useful to employ phosphorus trichloride in their preparation as described in Example I.

Example I 95.5 grams of naphthenic acids having an acid value of 220–240 (obtained from the Enjay Company) are charged into a glass reaction flask provided with a reflux condenser and stirrer and warmed to 56° C. 20.4 grams of phosphorus trichloride are added from a separatory funnel during a period of 1–1½ hours, holding the temperature at 55–58° C. A slight vacuum is pulled in order to remove hydrogen chloride. When all of the phosphorus trichloride is added, the atmosphere is purged with dry air in order to eliminate final traces of hydrogen chloride. The atmosphere above the reaction mix is kept dry and the temperature held at 50–55° C. for 6 hours longer. Agitation is then stopped and at this point the mixture separates into two layers. The bottom layer, which is largely composed of phosphorous acid is withdrawn, the mixture allowed to separate again and any residual bottom layer further withdrawn. At this point the naphthenoyl chloride is sampled and analyzed for free fatty acid by conventional methods. 2.5 grams more of phosphorus trichloride are added and the reaction mixture stirred for 6 hours longer at 50–55° C. then separated as before. 100 grams of naphthenoyl chloride are obtained by this process.

Example II

By a method similar to that of Example I, 1060 grams of naphthenic acids (acid value: 200–240) from Enjay Company and 230 grams of phosphorus trichloride were employed, the reaction time being cut to 4 hours. The reaction mass was allowed to stand overnight. The phosphorous acid lower layer formed by reaction was removed and 25 grams more of phosphorus trichloride were then added and the operation repeated. After further separation of the lower layer, 1114 grams of naphthenoyl chloride were obtained. The color of the product was dark brown. Its unreacted free fatty acid content was 2.5%. The naphthenoyl chloride prepared by the above method was then converted to naphthenoyl sarcosine as illustrated by the following example.

Example III 1114 grams of naphthenoyl chloride were slowly added to 1628 grams of a 30% aqueous solution of sodium sarcosinate, the temperature being held at 24° C. during addition and the pH being maintained at 9.6±0.2 by addition of 36° Bé. sodium hydroxide. Addition time was 1 hour and 20 minutes. Vigorous agitation was maintained throughout.

The reaction mixture was stirred at room temperature for ½ hour longer and then acidified with 415 grams of 50% sulfuric acid, the pH then being reduced to 4.0–4.5. Agitation was stopped and the mix separated into two layers. The upper one, consisting of naphthenoyl sarcosine, was twice washed with a liter of water containing 20 grams of sulfuric acid. After the second wash, the upper layer was held under vacuum at a sufficiently elevated temperature (about 60° C.) to remove excess water. Analysis of the product showed approximately 2% of free fatty acid.

The naphthenoyl sarcosines obtained by the method of this invention can be converted into their alkali metal salts, including sodium, potassium, ammonium salts; amine salts, including triethanolamine, monoethanolamine, diethanolamine, dimethylamine, diethylamine, methylamine, butylamine, dibutylamine salts; multivalent metal salts including barium, calcium, magnesium, lead, or zinc salts, by neutralization with the appropriate base. Any other suitable base may also be employed. Multivalent metal salts of copper, manganese, iron, cobalt, nickel, and the like may be prepared by metathesis between a water-soluble alkali metal salt of naphthenoyl sarcosine and a water-soluble salt of the metal in question. A convenient way of making the barium salt, for example, is to convert the naphthenoyl sarcosine to its sodium salt and then react with barius chloride. It may also be prepared by heating the naphthenoyl sarcosine with an approximately equivalent amount of barium hydrate. These methods are shown by the following examples.

*Example IV*

33.2 grams of naphthenoyl sarcosine were neutralized with 14 grams of 36° Bé. sodium hydroxide in 200 grams of water. The reaction mixture is poured in a thin stream into an aqueous solution containing 26.6 grams of barium chloride octahydrate. The barium salt separates out as a fluid upper layer which was washed thoroughly with water and dried in a vacuum oven at 40–50° C.

*Example V*

Barium hydroxide in stoichiometric amount was slowly sprinkled into a beaker containing 1 kg. of naphthenoyl sarcosine having an average equivalent weight of 446. The mixture was heated to 80° C. with constant stirring for 40 minutes. At the end of this time the product was a dark brown, molasses-like paste.

In addition to the various simple salts of naphthenoyl sarcosine previously described, this invention includes the preparation of more complicated salts of naphthenoyl sarcosine and complex amines such, for example, as imidazolines derived from fatty acids and imidazolines derived from naphthenic acids. The preparation of such a product is shown by Example VI.

*Example VI*

A sigma mixer was charged with 349 grams of the imidazoline obtained by condensing equimolar quantities of naphthenic acid and diethylene triamine. Condensation was carried out with azeotropic removal of water by refluxing with xylene at a temperature of 160° C. until two mols of water had been eliminated from the reaction mix. 332 grams of naphthenoyl sarcosine were added to the sigma mixer and the combination was mixed thoroughly for 2 hours in order to complete neutralization. Instead of diethylene triamine, hydroxyethyl ethylene diamine may be used in making an imidazoline employed according to the method of this example, and instead of naphthenic acid, oleic acid, stearic acid or coconut fatty acids may be employed in molecularly equivalent amounts.

The naphthenoyl sarcosine compounds described herein are particularly effective for use in paint drier compositions, for formulating cutting and grinding fluids as corrosion inhibitors for ferrous metals, and in lubricant compositions. The following are illustrative examples using barium naphthenoyl sarcosinate as the effective anti-corrosion agent for ferrous metals which is effective in amounts from about 1 to 50% by weight in a suitable liquid vehicle, such as mineral oil, kerosene, liquid oils, and waxes. Suitable thickening agents may be added to maintain a film of the metal naphthenoyl salt on the surface of the metal which is to be protected.

*Example VII*

A slushing compound was prepared by blending the following materials in parts by weight:

| | |
|---|---|
| Mineral oil (200 SUS at 212° F.) | 11.0 |
| Crude lanolin | 2.0 |
| Petroleum wax ("Mobilwax 2300") | 9.0 |
| Barium naphthenoyl sarcosinate from Example V | 3.5 |
| Condensation product of equimolar amounts of oleic acid and hydroxyethyl ethylene diamine | 3.5 |

The viscous fluid thus obtained was coated onto 1" x 4" strips of half-pound tin plate and the treated strips partially immersed in jars of water at room temperature. After standing for 3 months, no corrosion had occurred in the aqueous or air phase or at the interface. Control strips of untreated metal and of metal coated with the same composition from which the product of Example V was omitted rusted after a few days.

Similar results were obtained using 1010 cold rolled steel strips.

*Example VIII*

A clear solution was obtained by blending 5% by weight of the product of Example V with 50% of kerosene, 44% of 99% isopropanol, and 1% of the oleic acid ester of polyethylene glycol 300.

A 2% solution of the product of Example V was prepared in mineral oil having a viscosity of 200 Saybolt Universal seconds at 212° F.

Both of these solvent systems are applied to strips of tin plate and of 1010 cold rolled steel and tested as in Example VII, solvent being first allowed to separate at room temperature in the case of the formulation containing isopropanol.

By comparison with untreated strips and with strips coated with similar compositions from which the product of Example V was omitted, it was observed that marked corrosion inhibition was obtained with the compositions containing the barium salt of naphthenoyl sarcosine.

We claim:
1. Barium naphthenoyl sarcosinate.
2. An imidazoline salt of naphthenoyl sarcosine, wherein the imidazoline has the following structure:

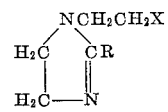

in which R is the residue of a fatty acid or a naphthenic acid and in which X is OH or NH₂.

References Cited by the Examiner

UNITED STATES PATENTS

| | | | |
|---|---|---|---|
| 2,063,987 | 12/1936 | Dreyfus | 260—514 |
| 2,179,979 | 11/1939 | Isler | 260—518 |
| 2,783,156 | 2/1957 | Oathout et al. | 106—14 |
| 2,791,510 | 5/1957 | Sproule et al. | 106—14 |
| 2,875,210 | 2/1959 | Bollenback et al. | 260—309.6 |
| 2,957,003 | 10/1960 | Johnson | 260—309.6 |
| 3,028,421 | 4/1962 | Bimber | 260—514 |
| 3,031,499 | 4/1962 | Hedrick | 260—514 |

OTHER REFERENCES

Jungermann et al.: Jour. Amer. Chem. Soc., vol. 78, 172-4 (1955).

Lockte et al.: The Petroleum Acids and Bases, pp. 246–48, 256–7, 266, 272 N.Y., Chem. Pub. Co. 1955.

WALTER A. MODANCE, *Primary Examiner.*

NICHOLAS RIZZO, *Examiner.*

NATALIE TROUSOF, *Assistant Examiner.*